(12) United States Patent
Yan et al.

(10) Patent No.: US 7,095,879 B2
(45) Date of Patent: *Aug. 22, 2006

(54) SYSTEM AND METHOD FOR FACE RECOGNITION USING SYNTHESIZED IMAGES

(75) Inventors: Jie Yan, Beijing (CN); Hong-Jiang Zhang, Beijing (CN)

(73) Assignee: Microsoft Corp., Redmond, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/053,337

(22) Filed: Feb. 7, 2005

(65) Prior Publication Data

US 2005/0147280 A1 Jul. 7, 2005

Related U.S. Application Data

(63) Continuation of application No. 09/728,936, filed on Dec. 1, 2000, now Pat. No. 6,975,750.

(51) Int. Cl.
*G06K 9/00* (2006.01)
*G06T 15/00* (2006.01)

(52) U.S. Cl. .................................. 382/118; 345/419

(58) Field of Classification Search ................ 382/115, 382/117–118, 154–159; 345/419, 420, 423, 345/473; 700/47–48
See application file for complete search history.

(56) References Cited

U.S. PATENT DOCUMENTS 6,975,750 B1 * 12/2005 Yan et al. .................... 382/118

* cited by examiner

*Primary Examiner*—Vikkram Bali
(74) *Attorney, Agent, or Firm*—Lyon & Harr, LLP; Katrina A. Lyon (57) ABSTRACT

A system and method that includes a virtual human face generation technique which synthesizes images of a human face at a variety of poses. This is preferably accomplished using just a frontal and profile image of a specific subject. An automatic deformation technique is used to align the features of a generic 3-D graphic face model with the corresponding features of these pre-provided images of the subject. Specifically, a generic frontal face model is aligned with the frontal image and a generic profile face model is aligned with the profile image. The deformation procedure results in a single 3-D face model of the specific human face. It precisely reflects the geometric features of the specific subject. After that, subdivision spline surface construction and multi-direction texture mapping techniques are used to smooth the model and endow photometric detail to the specific 3-D geometric face model. This smoothed and texturized specific 3-D face model is then used to generate 2-D images of the subject at a variety of face poses. These synthesized face images can be used to build a set of training images that may be used to train a recognition classifier.

18 Claims, 7 Drawing Sheets

SYSTEM AND METHOD FOR FACE RECOGNITION USING SYNTHESIZED IMAGES

CROSS-REFERENCE TO RELATED APPLICATIONS

This application is a continuation of a prior application entitled "SYSTEM AND METHOD FOR FACE RECOGNITION USING SYNTHESIZED IMAGES" which was assigned Ser. No. 09/728,936 and filed Dec. 1, 2000 now U.S. Pat. No. 6,975,750.

BACKGROUND OF THE INVENTION

1. Technical Field

This invention is directed towards a system and method for face recognition. More particularly, this invention relates to a system and method for face recognition using synthesized training images.

2. Background Art

Face recognition systems essentially operate by comparing some type of model image of a person's face (or representation thereof to an image or representation of the person's face extracted from an input image. In the past these systems, especially those that attempt to recognize a person at various face poses, required a significant number of training images to train them to recognize a particular person's face. The general approach is to use a set of sample images of the subject's face at different poses to train a recognition classifier. Thus, numerous face images of varying poses of each person to be recognized must be captured and input for training such systems. This requirement for a significant set of sample images is often difficult, if not impossible, to obtain. Capturing sample images may be complicated by the lack of "controlled" capturing conditions, such as consistent lighting and the availability of the subject for generating the sample images. Capturing of numerous training images may be more practical in the cases of security applications or the like, where it is likely that the subject to be recognized is readily available to generate the training image set, but may prove impractical for various consumer applications.

SUMMARY

The system and method according to the present invention, however, allows for face recognition even in the absence of a significant amount of training data. Further, it can recognize faces at various pose angles even without actual training images exhibiting the corresponding pose. This is accomplished by synthesizing training images depicting a subject's face at a variety of poses from a small number (e.g., two) of actual images of the subject's face. The present invention overcomes the aforementioned limitations in prior face recognition systems by a system and method that only requires the capture of one or two images of each person being recognized. Although, the capture of two training images of a person sought to be recognized is preferred, one training image will allow for the synthesis of numerous training images.

The system and process according to the present invention requires the input of at least one image of the face of a subject. If more than one image is input, each input should have a different pose or orientation (e.g., the images should differ in orientation by at least 15 degrees or so). Preferably two images are input—one frontal view and one profile view.

The system and process according to the present invention also employs a generic 3-D graphic face model. The generic face model is preferably a conventional polygon model that depicts the surface of the face as a series of vertices defining a "facial mesh".

Once the actual face image(s) and the generic 3-D graphic face model have been input, an automatic deformation technique is used to create a single, specific 3-D face model of the subject from the generic model and images. More specifically, to deform the generic face model to the specific model, an auto-fitting technique is adopted. In this technique, the feature point sets are extracted from the subject's frontal and profile images. Then the generic face model is modified to the specific face model by virtue of comparison and mapping between the two groups of feature point sets. In the preferred frontal/profile embodiment of the present invention, symmetry of the face is assumed. For example, if the right-side profile is input, it is assumed the left side of the face mirrors the right side. If more than two images are used to create the specific model, it is preferred to use the automatic deformation technique to create a 3-D model using two of the images (preferably the frontal/profile images) and the generic model to create a specific 3-D face model and then to refine the model using the additional images. Alternately, all images could be used to create the 3-D model without the refinement step. However, this would be more time consuming and processing intensive.

A subdivision spline surface construction technique is next used to "smooth" the specific 3-D face model. Essentially, the specific 3-D face model is composed of a series of facets which are defined by the aforementioned vertices. This facet-based representation is replaced with a spline surface representation. The spline surface representation essentially provides more rounded and realistic surfaces to the previously faceted face model using Bézier patches.

Once the subdivision spline surface construction technique is used to "smooth" the specific 3-D face model, a multi-direction texture mapping technique is used to endow texture or photometric detail to the face model to create a texturized, smoothed, specific, 3-D face model. This technique adds realism to the synthetic human faces. Essentially, the input images are used to assign color intensity to each pixel (or textel) of the 3-D face model using conventional texture mapping techniques. More particularly, for each Bézier surface patch of face surface, a corresponding "texture patch" is determined by first mapping the boundary curve of the Bézier patch to the face image. In the preferred embodiment employing frontal and profile input images, the face image chosen to provide the texture information depends on the preferred direction of the Bézier patch. When the angle between the direction and the Y-Z plane is less than 30 degrees, the frontal face image is used to map; otherwise the profile image is used. In addition, facial symmetry is assumed so the color intensities associated with the profile input image are used to texturize the opposite side of the 3-D model.

Once a 3-D face model of a specific subject is obtained, realistic individual virtual faces or 2-D face images, at various poses, can be easily synthesized using conventional computer graphics techniques (for example, using CAD/CAM model rotation). These techniques are used to create groups of training images for input into a "recognizer" to allow for training of the recognizer. It is also optionally possible to take the generated images and synthetically vary the illumination to produce each image at various illuminations. In this way, subjects can be recognized regardless of the illumination characteristics associated with an input image.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Figure 1:
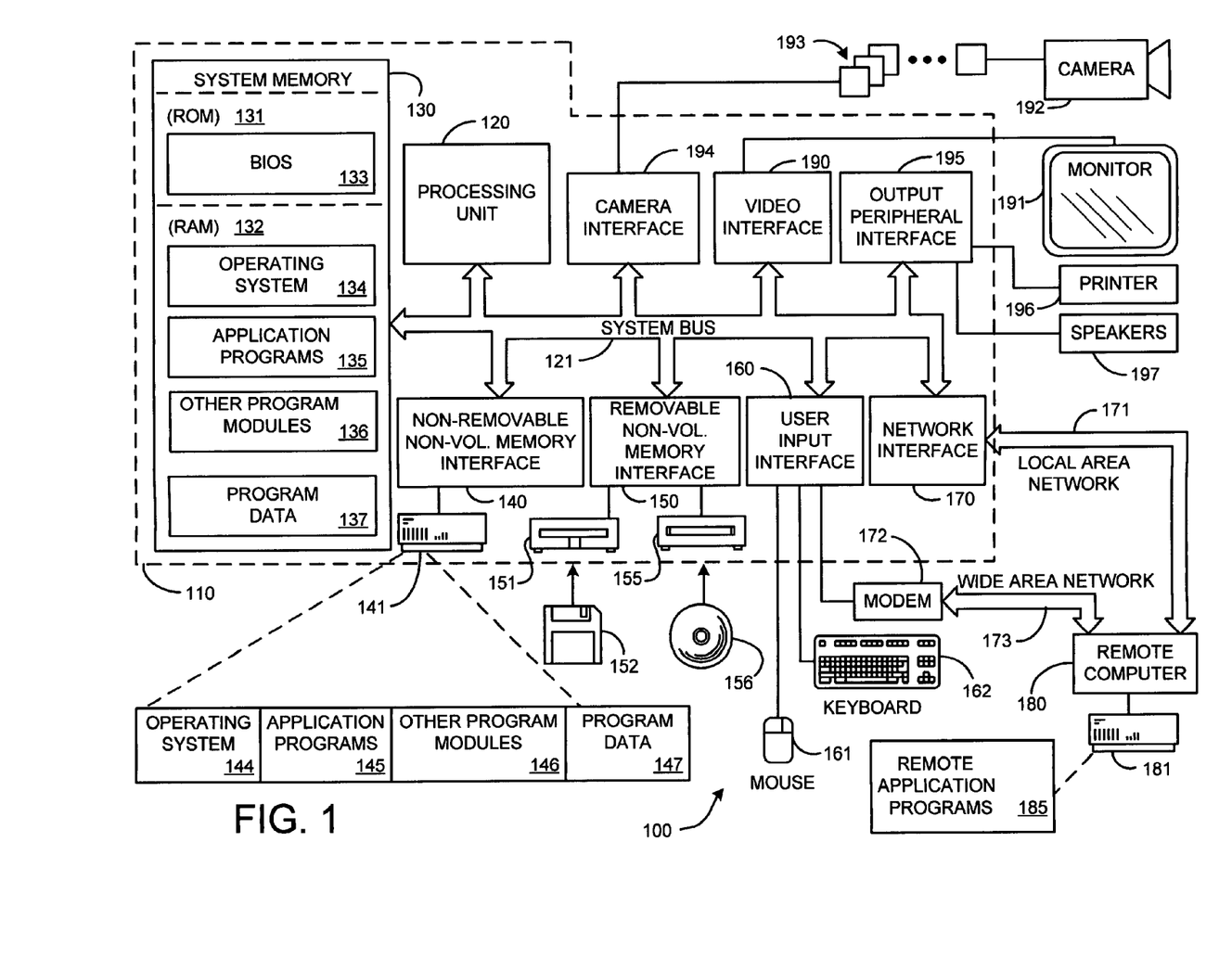
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any The exemplary operating environment having now been discussed, the remaining parts of this description section will be devoted to a description of the program modules embodying the invention.

The system and method according to the present invention only requires the capture of one or two images of each person being recognized. However, the capture of two training images of a person sought to be recognized is preferred, though one training image will allow for the synthesis of numerous training images.

Figure 2:
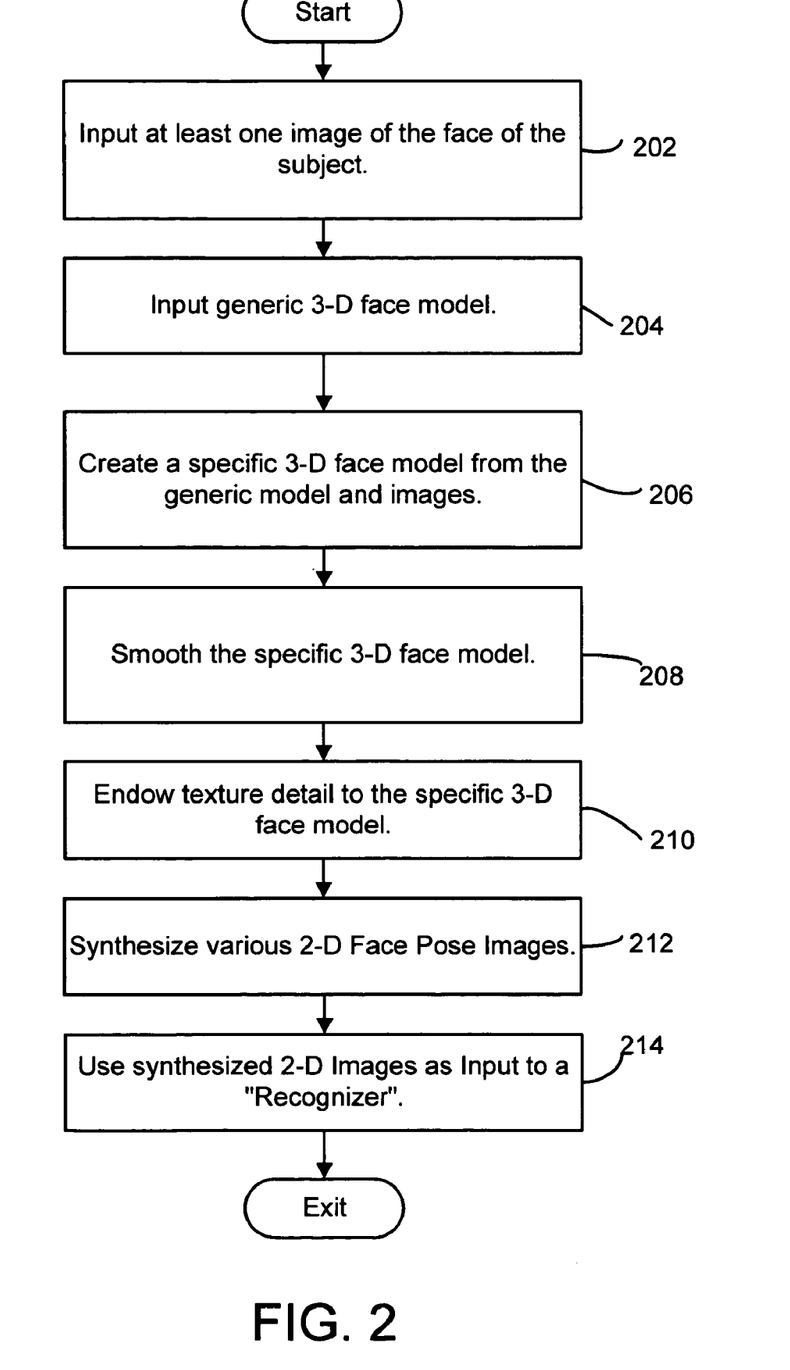
FIG. 2 is a flow chart depicting an overview of the system and method according to the present invention.

By way of overview, and as shown in FIG. 2, the system and method according to the present invention includes a virtual human face generation technique which synthesizes images of a human face at a variety of poses. This is preferably accomplished using just a frontal and profile image of a specific subject (process action 202). An automatic deformation technique is used to align the features of a generic 3-D graphic face model with the corresponding features of these pre-provided images of the subject (process actions 204 and 206). The deformation procedure results in a single 3-D face model of the specific human face. It reflects the geometric features of the specific subject. After that, subdivision spline surface construction and multi-direction texture mapping techniques are used to smooth the model and endow photometric detail to the specific 3-D geometric face model, as shown in process actions 208 and 210. This smoothed and texturized specific 3-D face model is then used to generate 2-D images of the subject at a variety of face poses (process action 212). These synthesized face images can be used to build a set of training images that may be used to train a recognition classifier, as is shown in process action 214.

Thus, the system and method according to the present invention has the advantage of requiring only a small amount of actual training data to train a recognition classifier. This minimizes the cost and effort required to obtain the training data and makes such recognition systems practical for even low-cost consumer applications.

The following paragraphs discuss in greater detail the various components of the system and method according to the present invention.

1.0 Inputting Actual Face Image(s)

The system and process according to the present invention requires the input of at least one image of the face of a subject. If more than one image is input, each input should have a different pose or orientation (e.g., the images should differ in orientation by at least 15 degrees or so). Preferably two images are input—one frontal view and one profile view.

2.0 Creating a Specific 3-D Face Model

As stated previously, a deformation technique is used to align the input images with a generic 3-D graphic face model to produce a 3-D face model specific to the person depicted in the images. More particularly, once the images have been input, a generic 3-D face model is modified to adapt the specified person's characteristics according to the features extracted automatically from the person's image. To this end, human facial features are extracted from the frontal image, and then the profile image, if available.

2.1 Extraction of Frontal Facial Features

Figure 3A:
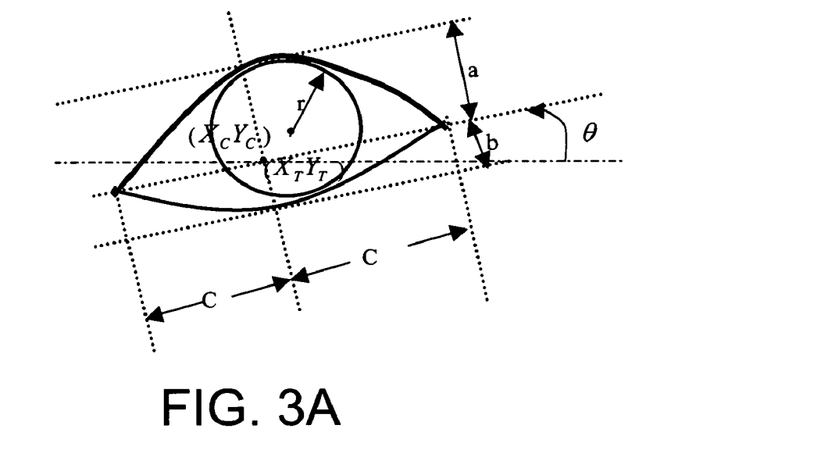
FIG. 3A depicts a template for extracting the location of the eyes of a person in an image.
Figure 3B:
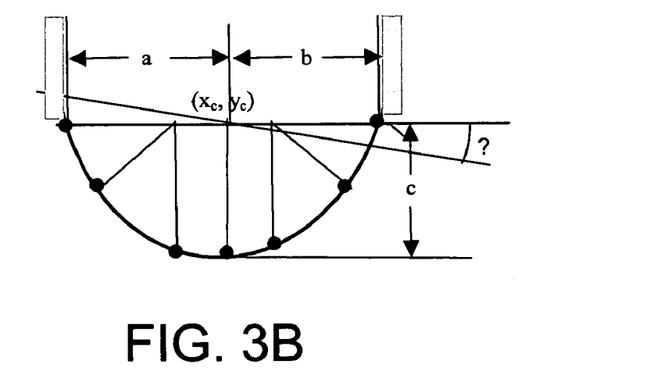
FIG. 3B depicts a template for extracting the location of the mouth of a person in an image.
Figure 3C:
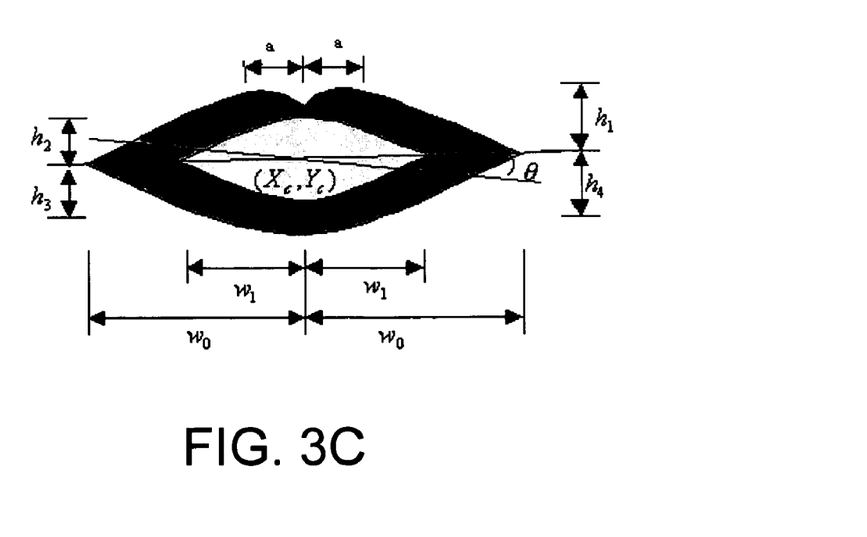
FIG. 3C depicts a template for extracting the location of the chin of a person in an image.

In order to extract the facial features in the frontal face images, a deformable template is employed to extract the location and shape of the salient facial organs such as eyes, mouth and chin. Examples of templates for the eye, the mouth and the chin are illustrated in FIGS. 3A–3C. The creation of the cost function is an important part in the deformable template procedure. To this end, different energy items are defined to express the fitting degree between the template and the image properties such as the peaks, valleys and edges. In addition, in order to avoid the template deforming to an illegal or unreasonable shape, an internal constraint function and a punishment function are defined. All these costs are combined to formulate the cost functions. Finally an optimal algorithm based on a greedy algorithm and multi-epoch cycle is used to search for a cost minimum. For example, the lip model is described by the following parameters: $(x_c, y_c)$, $\theta$, $w_1$, $w_0$, $a_{off}$, $h_1$, $q_0$, $h_2$, $h_3$, $h_4$, $q_1$. The curve equations of the lip's outline are defined as follows:

$$Y_{ul} = h_1 \times \left(1 - \frac{(x+a_{off})^2}{(w_0-a_{off})^2}\right) + 4q_0 \times \left(\frac{(x+a_{off})^4}{(w_0-a_{off})^4} - \frac{(x+a_{off})^2}{(w_0-a_{off})^2}\right)$$

$$Y_{ur} = h_1 \times \left(1 - \frac{(x-a_{off})^2}{(w_0-a_{off})^2}\right) + 4q_0 \times \left(\frac{(x-a_{off})^4}{(w_0-a_{off})^4} - \frac{(x-a_{off})^2}{(w_0-a_{off})^2}\right)$$

$$Y_{ui} = h_2 \times \left(1 - \frac{x^2}{w_0^2}\right)$$

$$Y_{li} = -h_3 \times \left(1 - \frac{x^2}{w_0^2}\right)$$

$$Y_l = -h_4 \times \left(1 - \frac{x^2}{w_1^2}\right) - 4q_1 \times \left(\frac{x^4}{w_1^4} - \frac{x^2}{w_1^2}\right)$$

The template matching process entails finding the cost function minimum. The cost function includes the integral of the following four curves:

$$E_1 = -\frac{1}{|\Gamma_1|} \int_{\Gamma_1} \Phi_e(\bar{x}) ds$$

$$E_2 = \frac{1}{|\Gamma_2|} \int_{\Gamma_2} \Phi_e(\bar{x}) ds$$

$$E_3 = -\frac{1}{|\Gamma_3|} \int_{\Gamma_3} \Phi_e(\bar{x}) ds$$

$$E_4 = \frac{1}{|\Gamma_4|} \int_{\Gamma_4} \Phi_e(\bar{x}) ds$$

where $\Gamma_i$ is the template curve that describes the lip shape. $|\oplus_i|$ is its length; $\Phi_c(\bar{x})$ is the gray level which is dropped onto the template. The punishment function is:

$$E_{temp} = k_{12}((h_1-h_2)-\overline{(h_1-h_2)})^2 + k_{34}((h_3-h_4)-\overline{(h_3-h_4)})^2$$

Where $k_{12}$, $k_{34}$ are the elastic coefficients, and $\overline{(h_1-h_2)}$, $\overline{(h_3-h_4)}$ are the average thickness of the lips. By combining the equations above, the final cost function is described as follows:

$$E = \sum_{i=1}^{4} C_i E_i + \sum_j K_j E_{penity_j},$$

where $C_i$, $K_i$ are weight coefficients.

Similar procedures are used to extract other facial features as is well known in the art.

2.2 Extraction of Profile Facial Features

Figure 4:
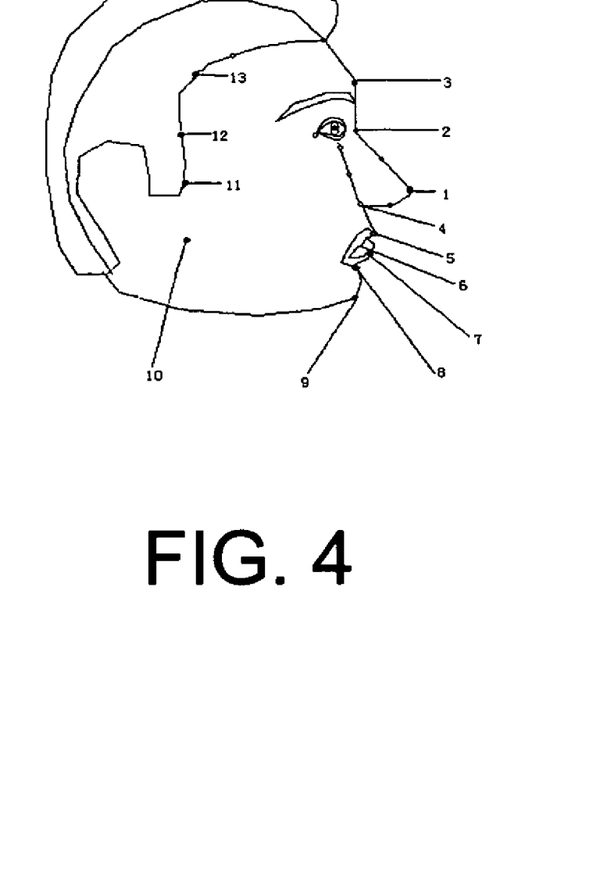
FIG. 4 depicts feature points as defined in the outline of a profile image.

A prescribed number of feature points are next defined in the profile model. For example, in tested embodiments of the present invention, thirteen feature points were defined in the profile model, as shown in FIG. 4. To extract these profile feature points, the outline of the profile image is first detected. The feature points can then be located by utilizing geometric relationship of the outline curve of the profile image.

2.2.1 Detection of Profile Outline

Color information is effective in image segmentation. It contains three properties: lightness, hue and saturation. For any type of color, the hue keeps constant under different lighting conditions. In YUV color space, hue is defined as the angle between U and V. Colors have high clustering performance in hue distribution. Even different images under varying lighting conditions have a similar hue histogram shape. A proper hue threshold is selected according to hue histogram by a moment-based threshold setting approach. A threshold operation is carried out for the profile image, and it produces a binary image. In the binary image, the white part contains the profile region, and the black part denotes background and hair. The profile outline is located by Canny edge extraction approach.

2.2.2 Location of Profile Feature Points

Based on the observation that many feature points are turning points in the profile outline, a conventional polygonal approximation method is used to detect some feature points, as shown in FIG. 4.

2.3 Modifying the Generic 3D Graphic Face Model

Figure 5:
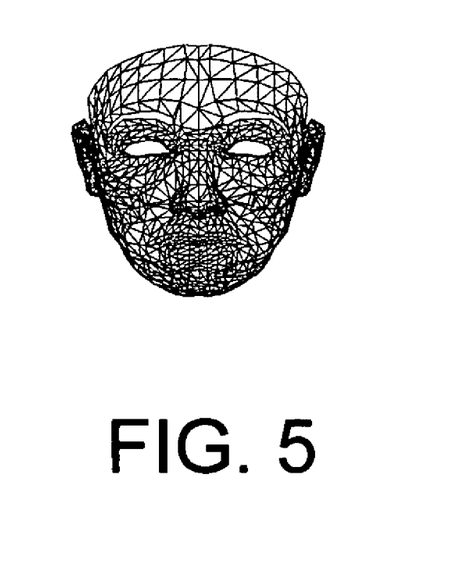
FIG. 5 depicts a generic face model employing a facial mesh.

A conventional generic 3-D mesh model is used to reflect facial structure. In tested embodiments of the present invention, the whole generic 3-D mesh model used consists of 1229 vertices and 2056 triangles. In order to reflect the smoothness of the real human face, polynomial patches are used to represent the mesh model. Such a mesh model is shown in FIG. 5.

It is necessary to adjust the general model to match the specific human face in accordance with the input human face images to produce the aforementioned specific 3-D face model. A parameter fitting process is preferably used accomplish this task.

To adjust the whole generic human face model automatically when one or several vertices are moved, a deformable face model is preferably adopted. Two approaches could be employed. One is a conventional elastic mesh model, in which each line segment is considered to be an elastic object. In this technique, the 3-D location of the extracted frontal and profile feature points are used to replace the corresponding feature points in the generic model. Then a set of nonlinear equations is solved for each movement to determine the proper location for all the other points in the model. Another method that could be used to modify the generic model is an optimizing mesh technique, in which deformation is finished by some optimizing criterions. This technique is implemented as follows. Let the set $V = \{v_0, v_1, \ldots v_n, \bar{v}_1, \bar{v}_2, \ldots v_m\}$ be the vertices of 3-D mesh, where $\bar{v}_1, \bar{v}_2, \ldots, \bar{v}_m$ are fixed vertices, which do not change when some vertices are moved. Suppose that the vertex $v_0$ is moved to $v'_0$. The corresponding shift of other vertices $v_1, v_2, \ldots, v_n$ must then be determined. To do this, it is considered that the balance status is achieved in the meaning of minimizing summation of displacement of all vertices and length change of all edges with weight. Let $v'_1, v'_2, \ldots, v'_n$ be new positions of vertices $v_1, v_2, \ldots, v_n$, $T = (x'_1, y'_1, z'_1, x'_2, y'_2, z'_2, \ldots, x'_n, y'_n, z'_n)^T$ be the vertices coordinate vector of $v'_1, v'_2, \ldots, v'_n$, and $e'_1, e'_2, \ldots, e'_E$ be all edge vectors on balance, where E is the number of edges in space mesh. It can be represented as the following minimization problem:

$$\min_{T \in R^{3n}} f(T) = c \sum_{i=1}^{n} \|v_i - v'_i\|^2 + \sum_{j=1}^{E} a_j \|e'_j\|^2,$$

where $c, a_1, a_2, \ldots, a_E$ are the weight coefficients.

The vector T can be determined by solving the minimization problem.

To reduce the complexity of computation, some simplification can occur. A direct consideration is to fix these vertices that are far from the moved vertex. The number of edges of the minimal path between two vertices is defined to be the distance of the vertices. Generally, the larger distance corresponds to the less effect. So, a distance threshold can be defined. Those vertices that are far from the threshold are considered as the fixed vertices.

Regardless of which of the foregoing adjustment techniques is employed, it is preferred the deformation of the generic model be implemented in two levels. One is a coarse level deformation and the other is a fine level deformation. Both the two deformations follow the same deformation mechanism above. In the coarse level deformation, a set of vertices in the same relative area are moved together. This set can be defined without restriction, but generally it should consist of an organ or a part of an organ of the face (e.g., eye, nose, mouth, etc.). In the fine level deformation, a single vertex of the mesh is moved to a new position, and the facial meshes vertices are adjusted vertex by vertex. The 3-D coordinates of the vertices surrounding the moved vertex are calculated by one of the aforementioned deformation techniques.

It is noted that prior to performing the deformation process, the 3-D face meshes are scaled to match the image's size. Then the facial contour is adjusted as well as the center positions of the organs using a coarse level deformation. The fine level deformation is then used to perform local adjustment.

Figure 6:
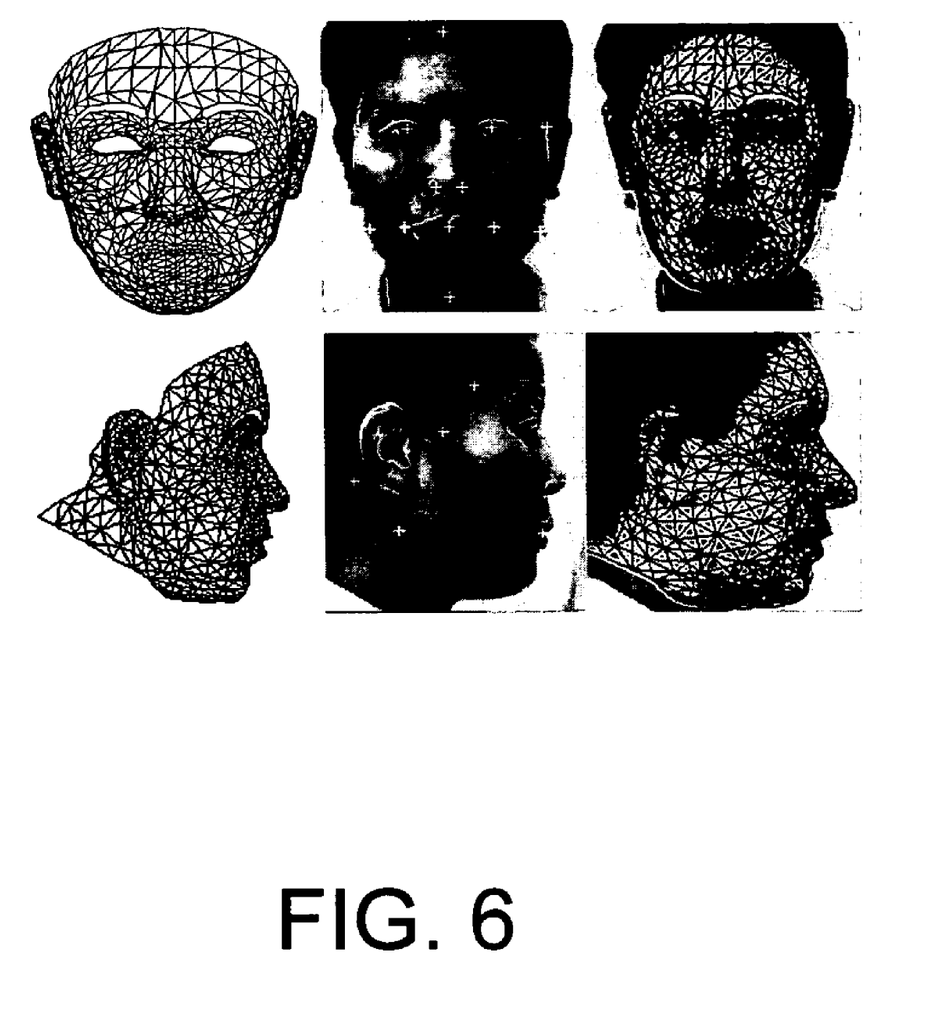
FIG. 6 depicts the matching process of the model and the frontal and profile images of a specific human being.

The two level deformation process is preferably performed interatively, until the model matches all the extracted points of the face images of the specific subject. FIG. 6 shows the matching processes of the model and the frontal and profile image of a specific person.

3.0 Smoothing the Specific 3D Face Model Using of Subdivision Spline Surface Construction Technique A subdivision spline surface construction technique is next used to "smooth" the specific 3-D face model. Essentially, the specific 3D face model is composed of a series of facets which are defined by the aforementioned vertices. This facet-based representation is replaced with a spline surface representation. The spline surface representation essentially provides more rounded and realistic surfaces to the previously faceted face model using Bézier patches.

Figure 7A:
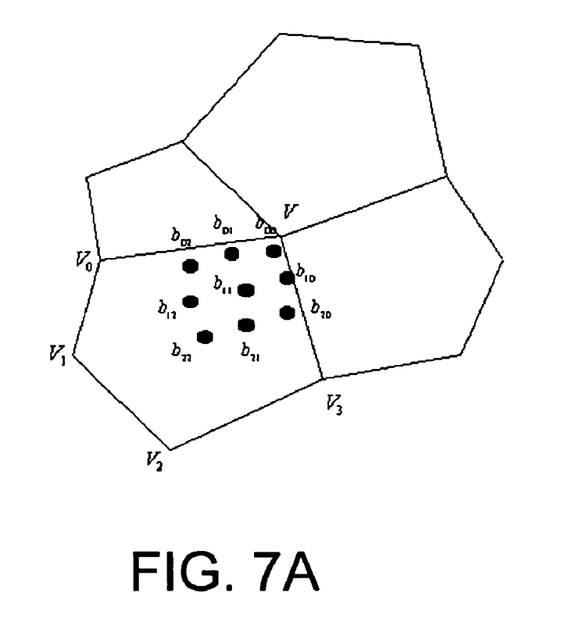
FIG. 7A depicts a bi-quadratic Bézier patch.
Figure 7B:
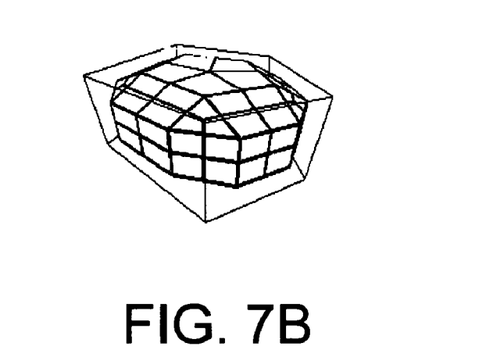
FIG. 7B depicts the control mesh of a subdivision spline surface.

In the construction of this subdivision spline surface representation, a radial basis function interpolation surface over the mesh is generated by the subdivision method. The generating of subdivision spline surface S can be considered as a polishing procedure similar to mesh refinement. From each face with n edges, a collection of n bi-quadratic Bézier patches are constructed. A bi-quadratic Bézier patch is illustrated in FIG. 7A. The control mesh of a subdivision spline surface generated by using following procedure is illustrated in FIG. 7B. Let $\Delta$ be the control mesh, V be a vertex of $\Delta$, $V_1, V_2, \ldots, V_n$ be neighboring vertices of the vertex V and $F_1, F_2, \ldots, F_k$ be all faces of $\Delta$ including vertex V, where $F_j$ is a face of $\Delta$ consisting of vertices of $\{V_{n_j}, V_{n_j+1}, \ldots, V_{n_{j+1}}\}$, $i=1, 2, \ldots, k$, $n_{k+1} = n_1 = n$. The bi-quadratic Bézier patch of face $F_i$ corresponding to vertex V is given by $$b_{00} = \left(\frac{1}{2} + \frac{1}{4k}\sum_{j=1}^{k}\frac{1}{t_j}\right)V + \frac{1}{4k}\sum_{j=1}^{k}\frac{t_j+2}{t_j}V_{n_j} +$$

$$\frac{1}{4k}\sum_{j=1}^{k}\sum_{s=n_j+1}^{n_{j+1}-1}\frac{1}{t_j}V_s,$$

$$b_{01} = \left(\frac{1}{2} + \frac{1}{8t_i} + \frac{1}{8t_{i-1}}\right)V + \frac{1}{8t_{i-1}}\sum_{j=n_{i-1}}^{n_i}V_j +$$

$$\frac{1}{8t_i}\sum_{j=n_i}^{n_{i+1}}V_j + \frac{1}{16}(V_{n_{i-1}} + 2V_{n_i} + V_{n_{i+1}}),$$

-continued $$b_{02} = \left(\frac{5}{16} + \frac{1}{8t_i} + \frac{1}{8t_{i-1}}\right)V + \frac{1}{8t_{i-1}} \sum_{j=n_{i-1}}^{n_i} V_j +$$

$$\frac{1}{8t_i} \sum_{j=n_i}^{n_{i+1}} V_j + \frac{1}{32}(10V_{n_1} + V_{n_{i-1}} + V_{n_{i+1}} + V_{n_{i-1}} + V_{n_i+1}),$$

$$b_{10} = \left(\frac{1}{2} + \frac{1}{8t_i} + \frac{1}{8t_{i+1}}\right)V + \frac{1}{8t_{i+1}} \sum_{j=n_{i+1}}^{n_{i+2}} V_j +$$

$$\frac{1}{8t_i} \sum_{j=n_i}^{n_{i+1}} V_j + \frac{1}{16}(V_{n_i} + 2V_{n_{i+1}} + V_{n_{i+2}}),$$

$$b_{11} = \left(\frac{1}{2} + \frac{1}{4t_i}\right)V + \frac{1}{4t_i} \sum_{j=n_i}^{n_{i+1}} V_j + \frac{1}{8}(V_{n_i} + V_{n_{i+1}})$$

$$b_{12} = \left(\frac{5}{16} + \frac{1}{4t_i}\right)V + \frac{1}{4t_i} \sum_{j=n_i}^{n_{i+1}} V_j + \frac{1}{16}(5V_{n_i} + V_{n_{i+1}} + V_{n_{i+1}}),$$

$$b_{20} = \left(\frac{5}{16} + \frac{1}{8t_i} + \frac{1}{8t_{i+1}}\right)V + \frac{1}{8t_{i+1}} \sum_{j=n_{i+1}}^{n_{i+2}} V_j +$$

$$\frac{1}{8t_i} \sum_{j=n_i}^{n_{i+1}} V_j + \frac{1}{32}(10V_{n_{i+1}} + V_{n_i} + V_{n_{i+2}} + V_{n_{i+1}-1} + V_{n_{i+1}+1}),$$

$$b_{21} = \left(\frac{5}{16} + \frac{1}{4t_i}\right)V + \frac{1}{4t_i} \sum_{j=n_i}^{n_{i+1}} V_j + \frac{1}{16}(5V_{n_{i+1}} + V_{n_{i+1}-1} + V_{n_i}),$$

$$b_{22} = \frac{1}{t_i}V + \frac{1}{t_i} \sum_{j=n_1}^{n_{i+1}} V_j$$

where $t_i = n_{i+1} - n_i + 2$ is the number of vertices of face $F_i$.

Figure 7C:
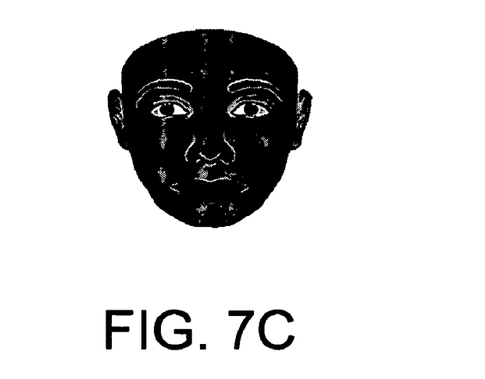
FIG. 7C depicts the reconstructed mesh model of a face to a smooth spline surface.

Through the subdivision procedure described above, the mesh model of the face is reconstructed as a smooth spline surface, as shown in FIG. 7C.

4.0 Endowing Texture (or Photometric) Detail Using Multi-Direction Texture Mapping Techniques Once the subdivision spline surface construction technique is used to "smooth" the specific 3D face model, a multi-direction texture mapping technique is used to endow texture or photometric detail to the face model to create a texturized, smoothed, specific, 3-D face model. This technique adds realism to the synthetic human faces. Essentially, the input images are used to assign color intensity to each pixel (or textel) of the 3-D face model using conventional texture mapping techniques. More particularly, for each Bézier surface patch of the face surface, a corresponding "texture patch" is determined by first mapping the boundary curve of the Bézier patch to the face image. In addition, facial symmetry is assumed so the color intensities associated with the profile input image are used to texturize the opposite side of the 3-D model.

In the preferred embodiment employing frontal and profile input images, the face image chosen to provide the texture information depends on the preferred direction of the Bézier patch. When the angle between the direction and the Y-Z plane is less than 30 degrees, the frontal face image is used to map; otherwise the profile image is used.

More specifically, let $$p(u,v) = \sum_{i=0}^{2} \sum_{j=0}^{2} b_{ij} B_{i,2}(u) B_{j,2}(v)$$

be the bi-quadratic Bézier patch. The tangent plane can be represented as the span of a pair of vectors.

Along u: $r_u = \frac{\partial p(u,v)}{\partial u} = \sum_{i=0}^{2} \sum_{j=0}^{2} b_{ij} B_{j,2}(v) \frac{\partial B_{i,2}(u)}{\partial u}$.

Along v: $r_v = \frac{\partial p(u,v)}{\partial v} = \sum_{i=0}^{2} \sum_{j=0}^{2} b_{ij} B_{i,2}(u) \frac{\partial B_{j,2}(v)}{\partial u}$.

The direction of Bézier patch can be estimated by average value of each point in the patch. That can be computed by the formula:

$$N = \int_0^1 \int_0^1 \frac{r_u \times r_v}{|r_u \times r_v|} du dv.$$

Figure 8A:
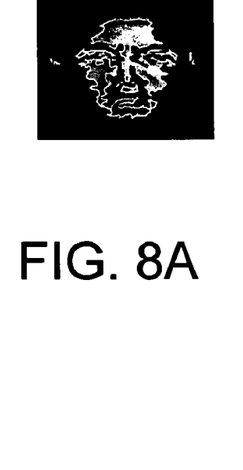
FIG. 8A depicts an image of the texture mapping results based on patches selected from a frontal view image.
Figure 8B:
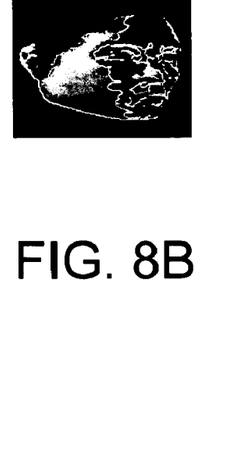
FIG. 8B depicts an image of the texture mapping results based on patches selected from profile view images.

According to the direction of each patch, texture information is selected from frontal and profile view images of the individual human face, as shown in FIG. 8.

5.0 Synthesize Various 2D Face Pose Images

Figure 9:
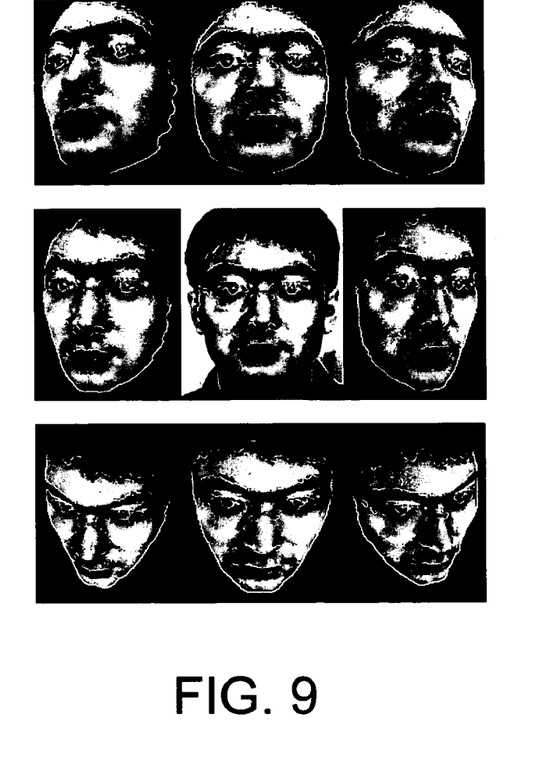
FIG. 9 depicts images of a given person's synthesized faces at various viewpoints.

Once a 3-D face model of a specific subject is obtained, realistic individual virtual faces or 2-D face images, at various poses, can be easily synthesized using conventional computer graphics techniques (for example, using CAD/CAM model rotation). For example, referring to FIG. 9, the center image is a real frontal image of a specific subject, and the images surrounding the real image are the synthesized virtual images at various poses generated using the present system and process. It is also optionally possible to take the generated images and synthetically vary the illumination to produce each image at various illuminations. In this way, subjects can be recognized regardless of the illumination characteristics associated with an input image.

The foregoing techniques can be used to create groups of training images for input into a "recognizer" of a face recognition system. For example, synthesized 2-D images could be used as training images for a "recognizer" like that described in co-pending patent application entitled a "Pose-Adaptive Face Recognition System and Process". This application, which has some common inventors with the present application and the same assignee, was filed on May 26, 2000 and assigned a Ser. No. 09/580,395. The subject matter of this co-pending application is hereby incorporated by reference.

In tested embodiments of the present system and method employing the recognition system of the co-pending application, synthesized training image groups were generated for every in-plane rotation (clockwise/counter-clockwise) of plus or minus 10–15 degrees and every out-of-plane rotation (up and down/right and left) of plus or minus 15–20 degrees, with increments of about 3–7 degrees within a group. The resulting synthetic images for each group were used to train a component of the recognizer to identify input images corresponding to the modeled subject having a pose angle within the group.

While the invention has been described in detail by specific reference to preferred embodiments thereof, it is understood that variations and modifications thereof may be made without departing from the true spirit and scope of the invention. For example, synthetic images generated by the present system and process could be employed as training images for recognition systems other than the one described in the aforementioned co-pending application. Further, the synthetic images generated by the present system and process could be used for any purpose where having images of a person at various pose angles is useful.

Wherefore, having thus described the present invention, what is claimed is:

1. A process for face recognition, comprising:
   an image inputting step for inputting an image of a face of a subject sought to be recognized having a particular face pose;
   a generic three dimensional model inputting step for inputting a generic three dimensional face model;
   a specific model creation step for creating a specific three dimensional face model of the specific subject sought to be recognized by deforming the generic face model to conform to the shape of the face depicted in the input image;
   a synthesizeing step for synthesizing various face pose images using the specific 3-D face model; and
   a training step for employing the synthesized images as training images to train a recognizer.

2. The process of claim 1 further comprising a smoothing step for using a spline surface construction technique to smooth the specific face model.

3. The process of claim 2 further comprising a texture mapping step for using a texture mapping technique to endow textural detail to the smoothed face model.

4. The process of claim 3 wherein the texture mapping step further comprises the a coloring step for using the input images to assign color intensity to each pixel of the three dimensional face model.

5. The process of claim 2 wherein a facet-based representation of the specific face is replaced with a spline surface representation.

6. The process of claim 1 wherein the image inputting step comprises inputting one frontal view and one profile view of the face.

7. The process of claim 1 wherein the image inputting step comprises inputting at least two views of a face each having poses varying in orientation from the others by at least 15 degrees.

8. The process of claim 1 wherein the generic three dimensional model inputting step comprises employing a polygon model that depicts the surfaces of the face as a series of vertices defining a facial mesh.

9. The process of claim 1 wherein the specific model creation step comprises a deformation step for using a deformation technique to create a specific three dimensional model of the subject from the generic model and the input images.

10. The process of claim 9 wherein the deformation step comprises:
    a feature point extracting step for extracting feature point sets from input frontal and profile images of the subject; and
    a modifying step for modifying the generic face model to the specific face model by comparison and mapping between the feature point sets.

11. The process of claim 1 wherein two or more images are used to create the model of a specific face, further comprising a a refining step for refining the specific model of the face by using additional images.

12. The process of claim 1 wherein face pose images are synthesized for every in-plane rotation of plus or minus 10 to 15 degrees and every out-of-plane rotation of plus or minus 15–20 degrees, with increments of about 3–7 degrees within a group.

13. The process of claim 1 wherein illumination is varied to produce the synthetic images at varied illuminations by taking the generated images and synthetically varying the illumination to produce each image at various illuminations.

14. A process for generating synthesized face images, the system comprising:
    an image inputting step for inputting at least one image of a face of a subject from the at least one camera;
    a generic model inputting step for inputting a generic face model;
    a specific model creating step for creating a specific face model of the subject by deforming the generic face model to conform to the shape of the face depicted in the input image; and
    a synthesizing step synthesize various face poses using the specific 3-D face model.

15. The process of claim 14, further comprising:
    a training step to employ the synthesized images as training images by inputting the synthesized images into a recognizer.

16. The process of claim 14, further comprising:
    a smoothing step for using a spline surface technique to smooth the specific face model.

17. The process of claim 16, further comprising a texturing step for using a texture mapping technique to endow textural detail to the smoothed face model.

18. A process for generating synthesized images of a face, comprising:
    a image inputting step for inputting an image of a face of a subject having a particular face pose;
    a generic model inputting step for inputting a generic three dimensional face model;
    a specific model creating step for creating a specific three dimensional face model of the specific subject by deforming the generic face model to conform to the shape of the face depicted in the input image;
    a smoothing step for using a spline surface construction technique to smooth the specific face model;
    a texturing step for using a texture mapping technique to endow textural detail to the smoothed face model;
    a synthesizing step for synthesizing various face pose images using the specific 3-D face model; and
    a training step for employing the synthesized images as training images to train a recognizer.

* * * * *